(12) United States Patent
Jin et al.

(10) Patent No.: US 9,940,471 B2
(45) Date of Patent: Apr. 10, 2018

(54) VIRTUAL OUTPUT QUEUE AUTHORIZATION MANAGEMENT METHOD AND DEVICE, AND COMPUTER STORAGE MEDIUM

(71) Applicants: ZTE Corporation, Shenzhen (CN); ZTE Microelectronics Technology Co., Ltd, Shenzhen (CN)

(72) Inventors: Rulong Jin, Shenzhen (CN); Hongwen Wu, Shenzhen (CN)

(73) Assignees: ZTE CORPORATION, Shenzhen, Guangdong (CN); Sanechips Technology Co., Ltd., Shenzhen, Guangdong (CN)

(*) Notice: Subject to any disclaimer, the term of this patent is extended or adjusted under 35 U.S.C. 154(b) by 244 days.

(21) Appl. No.: 14/909,223

(22) PCT Filed: Jun. 16, 2014

(86) PCT No.: PCT/CN2014/079972
§ 371 (c)(1),
(2) Date: Mar. 1, 2016

(87) PCT Pub. No.: WO2014/169883
PCT Pub. Date: Oct. 23, 2014

(65) Prior Publication Data
US 2016/0180105 A1    Jun. 23, 2016

(30) Foreign Application Priority Data
Jul. 31, 2013   (CN) .......................... 2013 1 0330273

(51) Int. Cl.
*G06F 21/62*    (2013.01)
*G06F 9/48*    (2006.01)
(Continued)

(52) U.S. Cl.
CPC ...... *G06F 21/6209* (2013.01); *G06F 9/45558* (2013.01); *G06F 9/4881* (2013.01); *G06F 13/385* (2013.01); *G06F 2009/45587* (2013.01)

(58) Field of Classification Search
CPC ............ G06F 21/6209; G06F 9/45558; G06F 9/4881; G06F 13/385; G06F 2009/45587
See application file for complete search history.

(56) References Cited

U.S. PATENT DOCUMENTS

| 6,011,775 A | 1/2000 | Bonomi |
| 6,052,375 A | 4/2000 | Bass |

(Continued)

FOREIGN PATENT DOCUMENTS

| CN | 1791025 A | 6/2006 |
| CN | 1801778 A | 7/2006 |

(Continued)

OTHER PUBLICATIONS

International Search Report in international application No. PCT/CN2014/079972, dated Sep. 26, 2014.
(Continued)

*Primary Examiner* — Melvin Marcelo
(74) *Attorney, Agent, or Firm* — Oppedahl Patent Law Firm LLC (57) ABSTRACT

The embodiments of the present disclosure disclose a VOQ authorization management method and device and a computer storage medium. The method includes that: an index of a scheduling unit at next scheduling level is determined according to a scheduling algorithm of a scheduler of a scheduling unit directly connected with a physical port and a weight and priority of the scheduling unit at the next scheduling level of the scheduling unit, scheduling linked list information of each scheduler of the scheduling unit at the next scheduling level is acquired, and an index of a
(Continued)

scheduler to be authorized corresponding to the same service grade with a current authorization in the scheduling unit at the next scheduling level is determined according to the scheduling linked list information until an index of a VOQ to be authorized corresponding to the same service grade with the current authorization is determined.

20 Claims, 4 Drawing Sheets

(51) Int. Cl.
*G06F 9/455* (2006.01)
*G06F 13/38* (2006.01)

(56) References Cited

U.S. PATENT DOCUMENTS

| | | | |
|---|---|---|---|
| 6,064,651 | A | 5/2000 | Rogers |
| 6,262,989 | B1 | 7/2001 | Gemar |
| 6,487,213 | B1 | 11/2002 | Chao |
| 7,324,536 | B1 | 1/2008 | Holtey |
| 7,372,857 | B1 | 5/2008 | Kappler |
| 7,559,062 | B2 | 7/2009 | Code |
| 7,643,493 | B1 | 1/2010 | Sayrafian-Pour |
| 8,451,854 | B1 | 5/2013 | Sayrafian-Pour |
| 8,902,883 | B1 | 12/2014 | Sayrafian-Pour |
| 2002/0176431 | A1 | 11/2002 | Golla |
| 2006/0077973 | A1 | 4/2006 | Yoon |
| 2007/0041390 | A1 | 2/2007 | Tatar |
| 2011/0063978 | A1 | 3/2011 | Hinosugi |
| 2011/0158091 | A1 | 6/2011 | Sun |

FOREIGN PATENT DOCUMENTS

| | | |
|---|---|---|
| CN | 1859351 A | 11/2006 |
| CN | 1968186 A | 5/2007 |
| CN | 101217499 A | 7/2008 |
| CN | 101232716 A | 7/2008 |
| CN | 101237417 A | 8/2008 |
| CN | 101257453 A | 9/2008 |
| CN | 101399763 A | 4/2009 |
| CN | 101621460 A | 1/2010 |
| CN | 101707556 A | 5/2010 |
| CN | 101741751 A | 6/2010 |
| CN | 102368741 A | 3/2012 |
| CN | 102387076 A | 3/2012 |
| CN | 102420758 A | 4/2012 |
| CN | 102546098 A | 7/2012 |
| CN | 102611608 A | 7/2012 |
| EP | 1233580 A1 | 8/2002 |
| EP | 1517484 A1 | 3/2005 |
| EP | 2302843 A1 | 3/2011 |
| EP | 2191619 B1 | 3/2012 |
| JP | 2002217962 A | 8/2002 |
| RU | 2384001 C2 | 3/2010 |
| WO | 0201821 A1 | 1/2002 |
| WO | 02084957 A2 | 10/2002 |
| WO | 2007121674 A1 | 11/2007 |
| WO | 2008058374 A1 | 5/2008 |
| WO | 2011116579 A1 | 9/2011 |
| WO | 2011150701 A1 | 12/2011 |

OTHER PUBLICATIONS

English Translation of the Written Opinion of the International Search Authority in international application No. PCT/CN2014/079972, dated Sep. 26, 2014.
Supplementary European Search Report in European application No. 14785615.7, dated Jun. 24, 2016.

VIRTUAL OUTPUT QUEUE AUTHORIZATION MANAGEMENT METHOD AND DEVICE, AND COMPUTER STORAGE MEDIUM

TECHNICAL FIELD

The present disclosure relates to a communication technology, and in particular to a Virtual Output Queue (VOQ) authorization management method and device and a computer storage medium.

BACKGROUND

Along with rapid increase of users and user service types, traffic of a packet data transmission network continuously increases, and a requirement on a full-service operating capability constantly increases. In case of network congestion, it is necessary to differentially process different data streams according to own Quality of Service (QoS) to meet a network management requirement. A basic thought of such a differentiated services (Diffserv) policy is to implement grade division of data streams of users according to requirements on QoS: when a network is idle, a data stream of any user may freely access the network; and when the network is busy, data streams in higher grades have higher priorities than those of data streams in lower grades during queuing and resource occupation, that is, preferred scheduling is implemented, thereby ensuring higher QoS.

A pull-based hierarchical scheduling technology has been gradually configured for a high-speed packet data transmission network due to its advantages of flexible scheduling manner, high bandwidth extensibility and the like. An operating company may allocate a scheduling level, a scheduling algorithm, a priority, a weight and the like to better ensure QoS according to different service requirements, such as voice, video and data services.

In a pull-based hierarchical scheduling structure, received messages are allocated to a corresponding VOQ according to service grades, then authorizations are transmitted to the VOQ level by level from a physical port according to a preset scheduling level relationship which is set according to QoS, and the messages in the VOQ are polled and scheduled out of the VOQ according to the number of the authorizations obtained by the queue. Therefore, a multi-level authorization distribution algorithm and solution are keys for achieving QoS, and determine important parameters such as delay, jitter, throughput and validity of each service. From the point of achievement of QoS, a Strict Priority (SP) scheduler is mainly adopted to implement distinction of service priorities of each service, and Weighted Fair Queuing (WFQ), Weighted Round Robin (WRR) and Fair Queuing (FQ) schedulers are adopted to allocate bandwidths according to certain weights.

Figure 1:
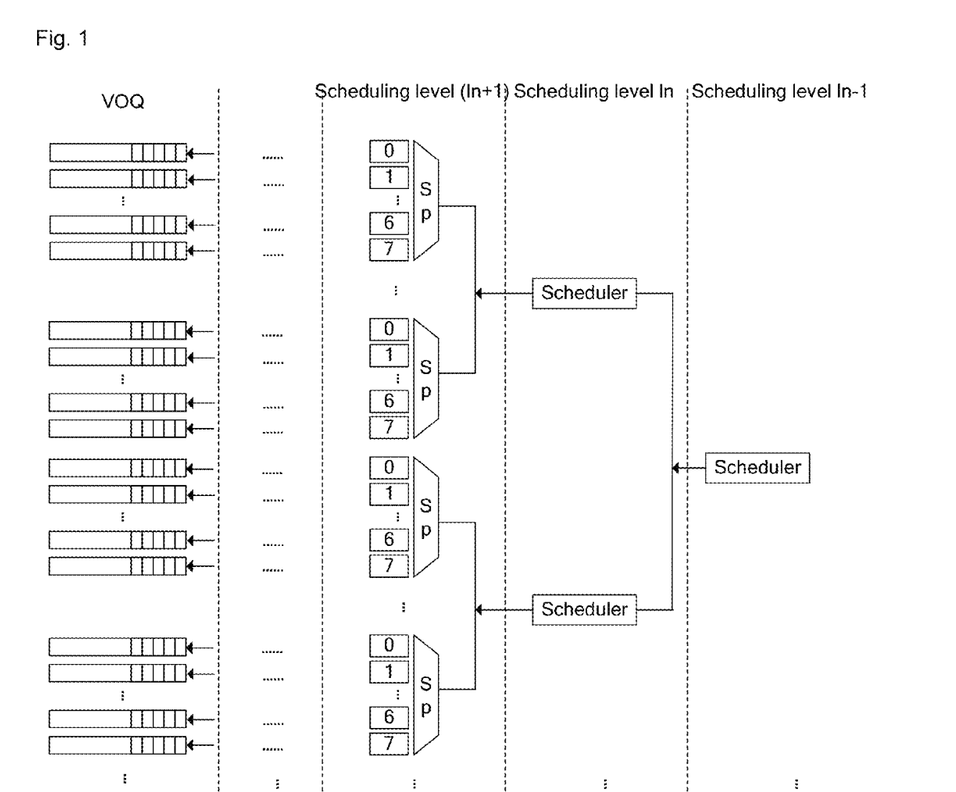
FIG. 1 is a diagram of pull-based hierarchical scheduling in the related technology.

However, schedulers of each level in a pull-based hierarchical scheduling-based authorization distribution technology in a related technology relatively independently operate according to own algorithms, and service grade transmission among the scheduling levels usually may not be implemented. FIG. 1 is a diagram of pull-based hierarchical scheduling in the related technology, and as shown in FIG. 1, an (In+1)th-level scheduler is mounted on an Inth-level scheduler. In an authorization distribution process, the Inth-level scheduler transmits an authorization to the (In+1)th-level scheduler according to its scheduling algorithm after obtaining the authorization from its upper-level scheduler. If the (In+1)th-level scheduler is an SP scheduler, service grade division of the SP scheduler may not be reflected on the Inth-level scheduler.

From the above, the related technology mainly has the following problems:

1) the authorization distribution technology with schedulers of each level independently scheduled is easy to implement, and since service streams with different priorities and the upper-level schedulers form "many-to-one" mapping, and service priority transmission is not supported, the upper-level schedulers may forcibly determine the same priority for the service streams of the lower-level schedulers with different priorities only; and 2) each scheduler is independent and user-service-based traffic aggregation shaping may not be implemented, so that only restricted QoS Diffsery may be implemented when user-based multi-service fine management is implemented.

SUMMARY

The embodiments of the present disclosure provide a VOQ authorization management method and device and a computer storage medium, so as to solve the problem that the related technology does not support service priority transmission and may not implement user-service-based aggregation shaping.

An embodiment of the present disclosure provides a VOQ authorization management method, which may include that:

according to a scheduling algorithm of a scheduler of a scheduling unit directly connected with a physical port and according to weight and priority of a scheduling unit at next scheduling level of the scheduling unit, an index of the scheduling unit at the next scheduling level is determined;

scheduling linked list information of each scheduler of the scheduling unit at the next scheduling level is acquired according to the index of the scheduling unit at the next scheduling level, and an index of a scheduler to be authorized corresponding to a same service grade with current authorization in the scheduling unit at the next scheduling level is determined according to the scheduling linked list information until an index of a VOQ to be authorized corresponding to the same service grade with the current authorization is determined; and the current authorization is transmitted from the physical port to the VOQ corresponding to the index of the VOQ to be authorized level by level according to the index of the scheduler to be authorized and the index of the VOQ to be authorized.

Preferably, the method may further include that:

before new authorization is transmitted at each scheduling level, an index of a scheduling unit at the next scheduling level of current scheduling level is updated according to a scheduling algorithm of a scheduler included in a scheduling unit at the current scheduling level and according to weight and priority of the scheduling unit at the next scheduling level of the current scheduling level.

Preferably, the method may further include that:

the index of the scheduling unit at the next scheduling level of current scheduling level is determined according to shaping state information of the scheduler included in the scheduling unit directly connected with the physical port; and correspondingly, corresponding shaping state information is also acquired according to the index of the scheduling unit at the next scheduling level of the current scheduling level, and an index of a scheduler to be authorized corresponding to the same service grade with the current authorization at the next scheduling level of the current scheduling level is determined according to the acquired shaping state information until the index of the VOQ to be authorized corresponding to the same service grade with the current authorization is determined.

Preferably, the indexes of the scheduling units may be indexes numbered consecutively, authorization priorities of the scheduling units at corresponding scheduling levels may be determined according to a preconfigured mounting relationship, and the indexes of the schedulers may include authorization priority information of the schedulers in the scheduling units; and the scheduling linked list information and the shaping state information of the schedulers may take the indexes of the schedulers in the scheduling units to which the schedulers belong as storage indexes.

Preferably, before the step that the index of the scheduler to be authorized corresponding to the same service grade is determined, the method may further include that: priority transmission of current scheduling level is determined to be identified as a set state;

correspondingly, when the priority transmission of the current scheduling level is determined to be identified as unset, the method may further include that:

scheduling linked list information of the scheduler of the scheduling unit at the next scheduling level is acquired according to the index of the scheduling unit at the next scheduling level, and the index of the scheduler to be authorized in the scheduling unit at the next scheduling level is determined according to the acquired scheduling linked list information until the index of the VOQ to be authorized is determined; and the current authorization is transmitted from the physical port to the VOQ corresponding to the index of the VOQ level by level according to the index of the scheduler to be authorized and the index of the VOQ to be authorized.

Preferably, before the step that the index of the scheduling unit at the next scheduling level is determined, the method may further include that:

storage description information of a packet is stored into a corresponding VOQ according to a QoS grade and destination port of a service corresponding to the packet; and correspondingly, the method may further include that:

after the authorization is transmitted to the corresponding VOQ, first storage information is extracted from the VOQ obtaining the authorization, a corresponding packet is acquired according to the extracted storage information, and the acquired packet is output to a destination port corresponding to the VOQ obtaining the authorization.

The present disclosure further provides a VOQ authorization management device, which may include a first determination unit, a second determination unit and an authorization transmission unit, wherein the first determination unit may be configured to determine, according to a scheduling algorithm of a scheduler of a scheduling unit directly connected with a physical port and according to weight and priority of a scheduling unit at next scheduling level of the scheduling unit, an index of the scheduling unit at the next scheduling level;

the second determination unit may be configured to acquire scheduling linked list information of each scheduler of the scheduling unit at the next scheduling level according to the index of the scheduling unit at the next scheduling level, and determine an index of a scheduler to be authorized corresponding to a same service grade with current authorization in the scheduling unit at the next scheduling level according to the scheduling linked list information until an index of a VOQ to be authorized corresponding to the same service grade with the current authorization is determined; and the authorization transmission unit may be configured to transmit the current authorization from the physical port to the VOQ corresponding to the index of the VOQ to be authorized level by level according to the index of the scheduler to be authorized and the index of the VOQ to be authorized.

Preferably, the device may further include:

an updating unit, configured to, before new authorization is transmitted at each scheduling level, update an index of a scheduling unit at the next scheduling level of current scheduling level according to a scheduling algorithm of a scheduler included in a scheduling unit at the current scheduling level and according to weight and priority of the scheduling unit at the next scheduling level of the current scheduling level.

Preferably, the first determination unit may further be configured to determine the index of the scheduling unit at the next scheduling level of current scheduling level according to shaping state information of the scheduler included in the scheduling unit directly connected with the physical port; and the second determination unit may further be configured to acquire corresponding shaping state information according to the index of the scheduling unit at the next scheduling level of the current scheduling level, and determine an index of a scheduler to be authorized corresponding to the same service grade with the current authorization at the next scheduling level of the current scheduling level according to the acquired shaping state information until the index of the VOQ to be authorized corresponding to the same service grade with the current authorization is determined.

Preferably, the indexes of the scheduling units may be indexes numbered consecutively, authorization priorities of the scheduling units in the corresponding scheduling levels may be determined according to a preconfigured mounting relationship, and the indexes of the schedulers may include authorization priority information of the schedulers in the scheduling units; and the scheduling linked list information and the shaping state information of the schedulers may take the indexes of the schedulers in the scheduling units to which the schedulers belong as storage indexes.

Preferably, the device may further include a third determination unit, a fourth determination unit and a fifth determination unit, wherein the third determination unit may be configured to, when priority transmission of current scheduling level is determined to be identified as a set state, trigger the first determination unit, and when the priority transmission of the current scheduling level is determined to be identified as an unset state, trigger the fourth determination unit;

the fourth determination unit may be configured to acquire scheduling linked list information of the scheduler of the scheduling unit at the next scheduling level according to the index of the scheduling unit at the next scheduling level, and determine the index of the scheduler to be authorized in the scheduling unit at the next scheduling level according to the acquired scheduling linked list information until the index of the VOQ to be authorized is determined; and the fifth determination unit may be configured to transmit the current authorization from the physical port to the VOQ corresponding to the index of the VOQ level by level according to the index of the scheduler to be authorized and the index of the VOQ to be authorized.

Preferably, the device may further include:

a VOQ management unit, configured to store storage description information of a packet into a corresponding VOQ according to a QoS grade and a destination port of a service corresponding to the packet, and after the authorization is transmitted to the corresponding VOQ, extract first storage information from the VOQ obtaining the authorization, acquire a corresponding packet according to the extracted storage information, and output the acquired packet to a destination port corresponding to the VOQ obtaining the authorization.

An embodiment of the present disclosure further provides a computer storage medium, in which computer-executable instructions may be stored, the computer-executable instructions being configured to execute the abovementioned VOQ authorization management method.

According to the technical solutions of the embodiments of the present disclosure, scheduling linked list information of each scheduler of a scheduling unit at next scheduling level is acquired according to an index of the scheduling unit at the next scheduling level of the current scheduling level, and an index of a scheduler to be authorized corresponding to the same service grade with the current authorization in the scheduling unit at the next scheduling level is determined until an index of a VOQ to be authorized corresponding to the same service grade with the current authorization is determined; the current authorization is transmitted from the physical port level by level to the VOQ corresponding to the index of the VOQ to be authorized according to the index of the scheduler to be authorized and the index of the VOQ to be authorized to implement service grade transmission among the scheduling levels and implement service priority transmission;

moreover, the schedulers of the scheduling units may correspond to different services, different numbers of schedulers are set to form scheduling units according to different scenario requirements, and aggregation shaping of multiple services of users is implemented according to the corresponding shaping state information.

DETAILED DESCRIPTION

In the embodiments of the present disclosure, according to a scheduling algorithm of a scheduler of a scheduling unit directly connected with a physical port and according to weight and priority of a scheduling unit at the next scheduling level of the scheduling unit, an index of the scheduling unit at the next scheduling level is determined; scheduling linked list information of each scheduler of the scheduling unit at the next scheduling level is acquired according to the index of the scheduling unit at the next scheduling level, and an index of a scheduler to be authorized corresponding to the same corresponding service grade with current authorization in the scheduling unit at the next scheduling level is determined according to the scheduling linked list information until an index of a VOQ to be authorized corresponding to the same service grade with the current authorization is determined; and the current authorization is transmitted from the physical port to the VOQ corresponding to the index of the VOQ to be authorized level by level according to the index of the scheduler to be authorized and the index of the VOQ to be authorized.

The present disclosure will be further described below with reference to the drawings and specific embodiments in detail.

Figure 2:
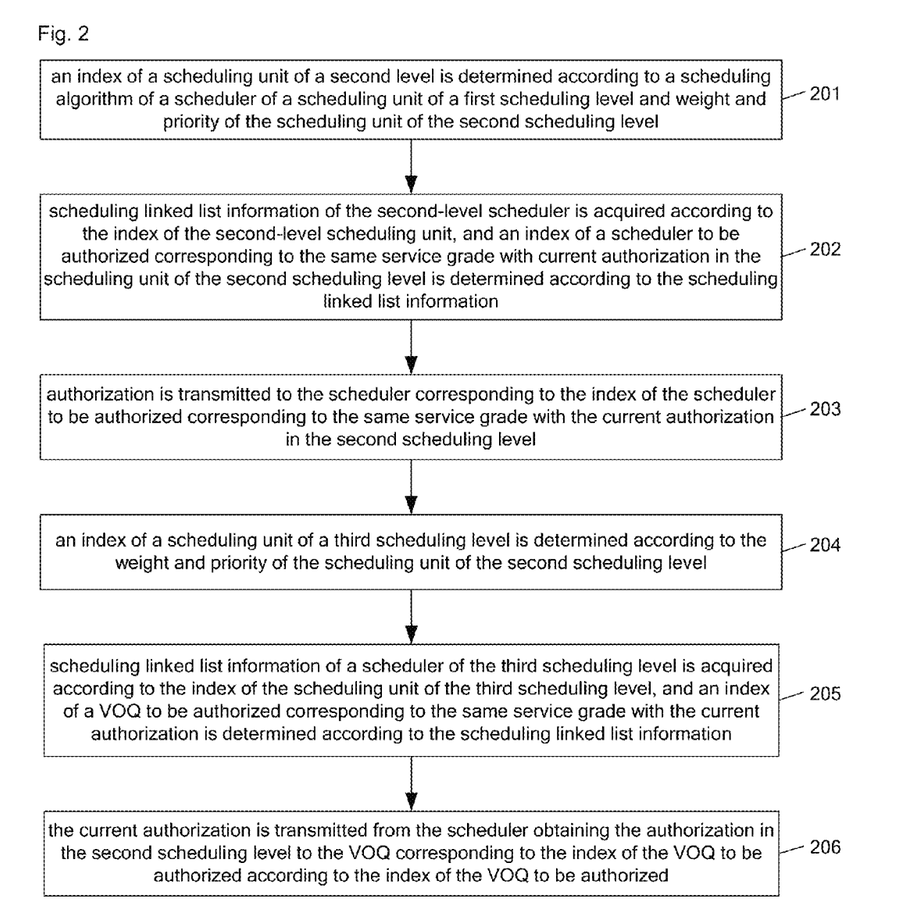
FIG. 2 is an implementation flowchart of a VOQ authorization management method according to an embodiment of the present disclosure.

An embodiment of the present disclosure describes a VOQ authorization management method. FIG. 2 is an implementation flowchart of a VOQ authorization management method according to an embodiment of the present disclosure. As shown in FIG. 2, the method includes the following steps:

Step 201: an index of a scheduling unit of a second level is determined according to a scheduling algorithm of a scheduler of a scheduling unit of a first scheduling level and according to weight and priority of the scheduling unit of the second scheduling level.

Before Step 201, storage description information of a packet is stored into a corresponding VOQ according to a QoS grade and a destination port of a service corresponding to the packet; and authorization is generated and transmitted to a physical port.

Here, in a preferred implementation mode of generating and transmitting authorization to a physical port, authorizations are generated according to a fixed period, and the authorizations are uniformly distributed to each physical port using a WFQ algorithm or a WRR algorithm according to rate allocation requirements of the physical ports.

Here, the total number of the generated authorizations is determined according to traffic requirements of all the physical ports, and the total number of the authorizations transmitted to each physical port is determined according to a traffic requirement of each physical port.

Here, the authorizations are distributed to VOQs corresponding to different services of corresponding users according to parameters including validity, delay, jitter, throughput and the like of different services.

In the embodiment of the present disclosure, the present disclosure is described with three scheduling levels as an example, and the technical solution of the embodiment of the present disclosure is still applicable to a scenario with more than three scheduling levels.

Here, a scheduling level directly connected with a physical port is a first scheduling level, scheduling units of the first scheduling level are first-level scheduling units, and schedulers in each first-level scheduling unit are first-level schedulers; and a scheduling level directly connected with the first scheduling level is a second scheduling level, and so on.

Here, authorization priorities of the scheduling units may be determined according to a mounting relationship preconfigured by a user, and indexes of the schedulers include information about authorization priorities of the schedulers in the scheduling units.

For example, indexes of the first-level schedulers of the first scheduling level identify authorization priorities of the first-level schedulers in the first-level scheduling units; weights and priorities of the first-level scheduling units may be preconfigured;

when first-level scheduling unit 0 includes eight first-level schedulers, authorization priorities of the eight schedulers are determined according to weights and priorities of the eight schedulers, identifiers 0~7 (corresponding to different authorization priorities) are allocated to the eight first-level schedulers, an ascending sequence of the indexes is set to be an ascending sequence of the authorization priorities, then first-level scheduler 0 has the highest authorization priority, and first-level scheduler 7 has the lowest authorization priority; when indexes of the first-level scheduling units are identified by four-bit binary numbers, three lower bits of binary numbers corresponding to 0~7 may represent the priorities (totally 7 authorization priorities) of the first-level schedulers in the (In+1)th-level scheduling units, and higher bit 0 represents the indexes of the first-level scheduling units at the corresponding first scheduling level; according to such a policy, an index of first-level scheduling unit 0 is a binary number 0000~0111 (corresponding to decimal numbers 0~7), wherein higher bit 0 of the index identifies the index of first-level scheduling unit 0 at the first-level scheduling level, and three lower bits 000~111 of the index identify the authorization priorities of the schedulers of first-level scheduling unit 0; and in such a manner, the indexes of schedulers imply the authorization priority information of the schedulers of a scheduling unit to which the schedulers belong.

Here, authorization priorities of second-level scheduling units of the second scheduling level are determined by the authorization priorities of the schedulers of the first scheduling level to which the second scheduling level is connected (subordinated), that is, scheduling units directly connected (mounted) with schedulers with high authorization priorities have high priorities. If m second-level scheduling units in n second-level scheduling units of the second scheduling level are directly connected with schedulers 0 of the first-level scheduling units, then when authorizations are distributed to schedulers 0, schedulers 0 transmit the authorizations to the scheduling units at the second scheduling level according to preconfigured weights of the m second-level scheduling units.

Here, when it is necessary to implement aggregation shaping of traffic, an index of a scheduling unit of the second scheduling level is determined according to a scheduling algorithm of a second-level scheduler of the second-level scheduling unit of the second scheduling level, weight and priority of a scheduling unit at the next scheduling level of the scheduling unit and shaping state information of the second-level scheduler.

The shaping state information of the scheduler takes the index of the scheduler in the scheduling unit to which the scheduler belongs as a storage index, the shaping state information is determined according to a preconfigured traffic requirement of each scheduler and the number of distributed authorizations, the shaping state information which is 1 identifies that the corresponding scheduler may obtain authorization, the shaping state information which is 0 identifies that the traffic requirement of the corresponding scheduler has been met and the scheduler does not need to obtain the authorization, and a shaping state of each scheduler may be queried in each authorization distribution process.

Step 202: scheduling linked list information of the second-level scheduler is acquired according to the index of the second-level scheduling unit, and an index of a scheduler to be authorized corresponding to the same service grade with current authorization in the scheduling unit of the second scheduling level is determined according to the scheduling linked list information.

Here, the scheduling linked list information of the scheduler takes the index of the scheduler in the scheduling unit to which the scheduler belongs as a storage index, and in such a manner, taking the index of the scheduling unit as a basic unit for storage, extraction and updating of the linked list information avoids an additional timeslot and a linked list storage resource from being occupied by authorization distribution.

Here, the scheduling linked list information includes information about a state (empty or full) of a linked list of the scheduler, the authorization may be distributed to the scheduler only when the linked list is not empty, the scheduling linked list information may be preset, and when there is no scheduling unit or VOQ at the next scheduling level of the scheduler, the linked list of the scheduler is empty.

Here, when it is necessary to implement aggregation shaping, corresponding shaping state information is acquired according to the index of the scheduling unit of the second scheduling level, and the index of the scheduler to be authorized corresponding to the same service grade with the current authorization at the second scheduling level is determined according to the acquired shaping state information.

Step 203: authorization is transmitted to the scheduler corresponding to the index of the scheduler to be authorized corresponding to the same service grade with the current authorization at the second scheduling level.

Step 204: an index of a scheduling unit of a third scheduling level is determined according to the weight and priority of the scheduling unit of the second scheduling level.

The basic thought of determining the index of a scheduling unit in Step 204 is the same as the basic thought of determining the index of a scheduling unit in Step 201, and will not be elaborated herein.

Step 205: scheduling linked list information of a scheduler of the third scheduling level is acquired according to the index of the scheduling unit of the third scheduling level, and an index of a VOQ to be authorized corresponding to the same service grade with the current authorization is determined according to the scheduling linked list information.

Here, every time when the authorization is transmitted, the indexes of the scheduling units of the second scheduling level and the third scheduling level are also re-determined according to scheduling algorithms of the schedulers of the scheduling units of the first scheduling level and the second scheduling level and the weights and priorities of the scheduling units of the second scheduling level and the third scheduling level; and correspondingly, the scheduling units of the first scheduling level and the second scheduling level also update scheduling linked lists of the schedulers to obtain the indexes of the schedulers to be authorized corresponding to the same service grades with the next authorizations in the scheduling units at the next scheduling level according to the corresponding scheduling algorithms until the indexes of the VOQs to be authorized corresponding to the same service grades with the next authorizations are determined.

Here, the same service at each scheduling level has the same priority, and since the authorization priorities of the scheduling units may be determined according to a preconfigured mounting relationship, the service corresponding to the same service grade at each scheduling level is mounted (subordinated) to the scheduler of the upper scheduling level of the same service grade. For example, if first-level scheduler 0 of each first-level scheduling unit at the first scheduling level performs authorization transmission on a VOQ corresponding to a standard-definition television service, schedulers mounted to first-level schedulers 0 at the second scheduling level and the third scheduling level are correspondingly responsible for authorization transmission of the VOQ corresponding to the standard-definition television service, and then each scheduler of the scheduling units of the second scheduling level and the third scheduling level establishes a one-to-one mapping relationship with each scheduler of the scheduling units of the upper levels for the same service.

Before Step 201, it is also necessary to determine that priority transmission of a current scheduling level is identified as a set state;

correspondingly, when the priority transmission of the current scheduling level is identified as unset, the scheduling linked list information of the scheduler of the scheduling unit of the second scheduling level is acquired according to the index of the scheduling unit of the second scheduling level, and the index of the scheduler to be authorized in the scheduling unit of the second scheduling level is determined according to the acquired scheduling linked list information;

the scheduling linked list information of each scheduler of the scheduling unit of the second scheduling level is acquired according to the index of the scheduler to be authorized in the scheduling unit of the second scheduling level, and the index of the scheduler to be authorized in the scheduling unit of the second scheduling level is determined according to the scheduling linked list information, wherein the scheduler to be authorized and the current authorization may correspond to different services;

the current authorization is transmitted to the scheduler corresponding to the index of the scheduler to be authorized corresponding to the same service grade with the current authorization in the second scheduling level;

the index of the scheduling unit of the third scheduling level is determined according to the scheduling algorithm of the scheduler of the second-level scheduling unit and the weight and priority of the scheduling unit of the third scheduling level; and the scheduling linked list information of the scheduler of the scheduling unit of the third scheduling level is acquired according to the index of the scheduling unit of the third scheduling level, and the index of the VOQ to be authorized in the scheduling unit of the third scheduling level is determined.

Step 206: the current authorization is transmitted from the scheduler obtaining the authorization in the second scheduling level to the VOQ corresponding to the index of the VOQ to be authorized according to the index of the VOQ to be authorized.

The authorization priorities of the scheduling units of each scheduling level are determined by the authorization priorities of the schedulers of the upper scheduling levels to which the scheduling levels are directly connected (subordinated), so that the scheduling units directly connected to the same scheduler have the same authorization priorities. Therefore, the authorization priority of the VOQ may be traced back to the corresponding scheduler of the first scheduling level (the highest scheduling level), the authorization priority of the scheduler in the scheduling unit to which the scheduler belongs is the authorization priority corresponding to the VOQ, and the number of schedulers with different priorities in the scheduling unit of the first scheduling level is determined according to the number of service grades of services, that is, authorization priorities are divided according to the service grades from the first scheduling level, and different service grades correspond to different authorization priorities.

VOQs are associated with different grades of services of a user, first storage information is extracted from VOQs obtaining authorizations, corresponding packets are acquired according to the extracted storage information, and the acquired packets are output to destination ports corresponding to the VOQs obtaining the authorizations.

The number of the authorizations obtained by a VOQ determines the number of bytes scheduled and output by a packet of the VOQ, i.e. throughput; an authorization obtaining interval of the VOQ determines a delay and a jitter of scheduling and output of the packet of the VOQ; and the priority of the VOQ determines a service grade of a user service corresponding to the VOQ in case of network congestion.

According to the technical solution of the embodiment of the present disclosure, the scheduling linked list information of each scheduler of a scheduling unit at the next scheduling level is acquired according to the index of the scheduling unit at the next scheduling level of the current scheduling level, and the index of a scheduler to be authorized corresponding to the same service grade with the current authorization in the scheduling unit at the next scheduling level is determined until the index of a VOQ to be authorized corresponding to the same service grade with the current authorization is determined; the current authorization is transmitted from the physical port to the VOQ corresponding to the index of the VOQ to be authorized level by level according to the index of the scheduler to be authorized and the index of the VOQ to be authorized to implement service grade transmission among the scheduling levels and implement service priority transmission;

moreover, the schedulers of the scheduling unit may correspond to different services, different numbers of schedulers are set to form scheduling units according to different scenario requirements, and aggregation shaping of multiple services of users is implemented according to the corresponding shaping state information;

the indexes of the scheduling units are consecutive indexes, the authorization priorities of the scheduling units at the corresponding scheduling levels are determined according to the preconfigured mounting relationship so as to be configured according to different requirements, and the indexes of the schedulers include the authorization priority information of the schedulers in the scheduling unit; and the scheduling linked list information and shaping state information of the schedulers take the indexes of the schedulers in the scheduling units to which the schedulers belong as the storage indexes, so that user-based multi-service fine management is implemented without occupying additional hardware resources.

Figure 3:
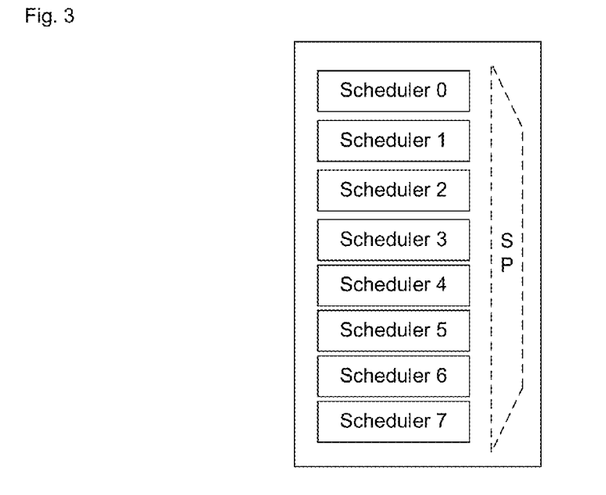
FIG. 3 is a structure diagram of a scheduling unit according to an embodiment of the present disclosure.

The scheduling unit in the embodiment of the present disclosure is further described below in detail. FIG. 3 is a structure diagram of a scheduling unit according to an embodiment of the present disclosure. As shown in FIG. 3, the scheduling unit consists of a group of schedulers with consecutive indexes, indexes of the schedulers are associated with priorities of the schedulers in the scheduling unit, and an algorithm of each scheduler may be independently configured according to a practical application requirement, such as SP, WFQ, WRR and FQ.

The scheduling unit shown in FIG. 3 consists of eight schedulers, and three lower bits (corresponding to decimal numbers 0, 1, 2, 3, 4, 5, 6, 7 respectively) of the indexes of the schedulers identify the priorities of the schedulers in the scheduling unit, wherein 0 identifies the highest priority, 7 identifies the lowest priority, and the schedulers with the consecutive indexes in the scheduling unit may be called as an integrated scheduling unit (when priority transmission is identified as unset), and may also establish a mapping relationship with schedulers of an upper-level scheduling unit for the same service respectively (when the priority transmission is identified as set).

When the schedulers establish the mapping relationship with the schedulers in the upper-level scheduling unit for the same service respectively, priority transmission between the scheduling units may be implemented, and the number of the schedulers included in each scheduling unit is determined by the number of services with an aggregation shaping requirement. For example, services of a user may be divided into: Internet Protocol (IP) voice, video communication, high-definition television, standard-definition television, standard-definition on demand, online game and high-speed network access. If a priority of the IP voice service of the user is higher than that of the video communication service and the two services require aggregation shaping, that is, when the IP voice service of the user has surplus traffic, the surplus traffic is allocated to the video communication service for use, then a scheduling unit consisting of two schedulers may be set, a VOQ to which the IP voice service is mapped is associated with the high-priority scheduler of the scheduling unit, and a VOQ to which the video communication service is mapped is associated with the low-priority scheduler of the scheduling unit. Similarly, aggregation shaping of the high-definition television, standard-definition television, standard-definition on demand and online game services may also be implemented by a scheduling unit consisting of four schedulers when needed, and VOQs to which the four services are mapped are associated with the schedulers with different priorities in the scheduling unit respectively. The number of aggregation shaping services of the scheduling unit may be configured according to a practical application scenario, so that high-accuracy management for QoS is implemented, and resources are saved.

An embodiment of the present disclosure also describes a computer storage medium, in which computer-executable instructions are stored, the computer-executable instructions being configured to execute the VOQ authorization management method shown in FIG. 2.

Figure 4:
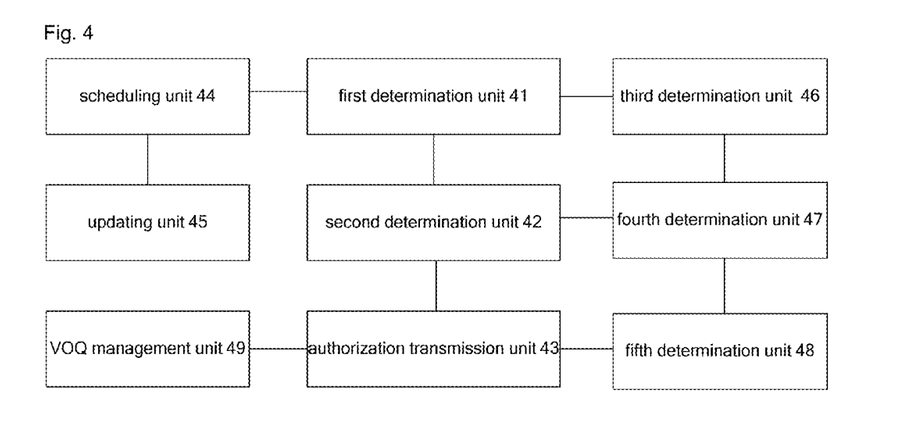
FIG. 4 is a structure diagram of a VOQ authorization management device according to an embodiment of the present disclosure.

An embodiment of the present disclosure also describes a VOQ authorization management device. FIG. 4 is a structure diagram of a VOQ authorization management device according to an embodiment of the present disclosure. As shown in FIG. 4, the device includes a first determination unit 41, a second determination unit 42, a authorization transmission unit 43 and scheduling units 44, wherein the first determination unit 41 is configured to determine an index of the scheduling unit 44 at the next scheduling level according to a scheduling algorithm of a scheduler of the scheduling unit 44 directly connected with a physical port and according to weight and priority of the scheduling unit 44 at the next scheduling level of the scheduling unit 44;

the second determination unit 42 is configured to acquire scheduling linked list information of each scheduler of the scheduling unit 44 at the next scheduling level according to the index of the scheduling unit 44 at the next scheduling level, and determine an index of a scheduler to be authorized corresponding to the same service grade with current authorization in the scheduling unit 44 at the next scheduling level according to the scheduling linked list information until an index of a VOQ to be authorized corresponding to the same service grade with the current authorization is determined; and the authorization transmission unit 43 is configured to transmit the current authorization to the VOQ corresponding to the index of the VOQ to be authorized level by level from the physical port according to the index of the scheduler to be authorized and the index of the VOQ to be authorized.

Preferably, the device further includes:

an updating unit 45, configured to, before new authorization is transmitted at each scheduling level, update an index of the scheduling unit 44 at the next scheduling level of the current scheduling level according to a scheduling algorithm of a scheduler included in the scheduling unit 44 at the current scheduling level and according to weight and priority of the scheduling unit 44 at the next scheduling level of the current scheduling level.

Preferably, the first determination unit 41 is further configured to determine the index of the scheduling unit 44 at the next scheduling level of the current scheduling level according to shaping state information of the scheduler included in the scheduling unit 44 directly connected with the physical port; and the second determination unit 42 is further configured to acquire corresponding shaping state information according to the index of the scheduling unit 44 at the next scheduling level of the current scheduling level, and determine an index of a scheduler to be authorized corresponding to the same service grade with the current authorization at the next scheduling level of the current scheduling level according to the acquired shaping state information until the index of the VOQ to be authorized corresponding to the same service grade with the current authorization is determined.

Preferably, the indexes of the scheduling units 44 may be indexes numbered consecutively, and the indexes of the scheduling units 44 include authorization priority information of the scheduling units 44 at the corresponding scheduling levels and authorization priority information of the schedulers of the scheduling units 44 in the scheduling units 44; and the scheduling linked list information and shaping state information of the schedulers may take the indexes of the schedulers in the scheduling units 44 to which the schedulers belong as storage indexes.

Preferably, the device further includes a third determination unit 46, a fourth determination unit 47 and a fifth determination unit 48, wherein the third determination unit 46 is configured to, when priority transmission of the current scheduling level is determined to be identified as a set state, trigger the first determination unit 41, and when the priority transmission of the current scheduling level is determined to be identified as an unset state, trigger the fourth determination unit 47;

the fourth determination unit 47 is configured to acquire scheduling linked list information of the scheduler of the scheduling unit 44 at the next scheduling level according to the index of the scheduling unit 44 at the next scheduling level, and determine the index of the scheduler to be authorized in the scheduling unit 44 at the next scheduling level according to the acquired scheduling linked list information until the index of the VOQ to be authorized is determined; and the fifth determination unit 48 is configured to transmit the current authorization to the VOQ corresponding to the index of the VOQ level by level from the physical port according to the index of the scheduler to be authorized and the index of the VOQ to be authorized.

Preferably, the device further includes:

a VOQ management unit 49, configured to store storage description information of a packet into a corresponding VOQ according to a QoS grade and a destination port of a service corresponding to the packet, and after the authorization is transmitted to the corresponding VOQ, extract first storage information from the VOQ obtaining the authorization, acquire a corresponding packet according to the extracted storage information, and output the acquired packet to a destination port corresponding to the VOQ obtaining the authorization.

During a practical application, each unit shown in FIG. 4 may be implemented by a Central Processing Unit (CPU), Digital Signal Processor (DSP) or Field Programmable Gate Array (FPGA) in the VOQ authorization management device.

Figure 5:
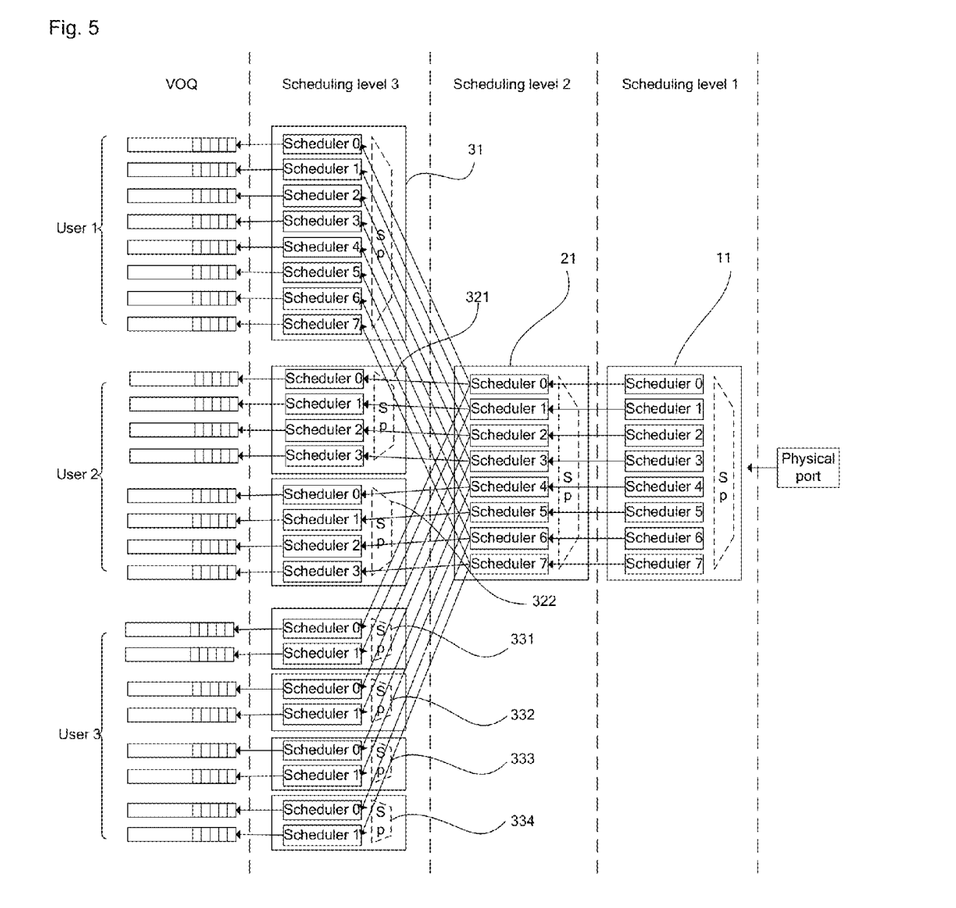
FIG. 5 is a diagram of VOQ authorization management according to an embodiment of the present disclosure.

FIG. 5 is a diagram of VOQ authorization management according to an embodiment of the present disclosure. As shown in FIG. 5, a scheduling structure in the embodiment is constructed on the basis of a network model of an application scenario and a service layer agreement, and scheduling level 1, scheduling level 2 and scheduling level 3 in the figure may correspond to authorization management scheduling of a port level, a service level and a user level respectively. User 1, user 2 and user 3 have eight services with different priorities, and priorities of VOQs corresponding to different services are mapped to corresponding schedulers of a scheduling unit at scheduling level 2 through corresponding schedulers of scheduling units at scheduling level 3, and then are mapped to corresponding schedulers of a scheduling unit in scheduling level 1 through the corresponding schedulers of the scheduling unit in scheduling level 2, wherein the eight services, with different priorities, of user 1 are mapped into the corresponding VOQs respectively, and the priorities of the VOQs are mapped to scheduler 0 to scheduler 7 in scheduling unit 21 of scheduling level 2 through scheduler 0 to scheduler 7 of corresponding scheduling unit 31 at scheduling level 3, and are mapped to scheduler 0 to scheduler 7 of scheduling unit 11 of scheduling level 1 through corresponding scheduler 0 to scheduler 7 of scheduling unit 21 at scheduling level 2; since the eight services of user 1 are mapped to the eight schedulers of the same scheduling unit 31 at scheduling level 3, the eight services of user 1 are subjected to unified aggregation shaping;

similarly, the eight services, with different priorities, of user 2 are mapped into the corresponding VOQs respectively, and the priorities of the VOQs are mapped to scheduler 0 to scheduler 7 in scheduling unit 21 of scheduling level 2 through scheduler 0 to schedulers 4 of corresponding scheduling units 321 and 322 at scheduling level 3, and are mapped to scheduler 0 to scheduler 7 of corresponding scheduling unit 11 of scheduling level 1 through scheduler 0 to scheduler 7 of corresponding scheduling unit 21 of scheduling level 2, wherein the eight services of user 2 are mapped to schedulers 0 to schedulers 4 of scheduling units 32 and 33 of scheduling level 2 respectively, so that user 2 performs service aggregation shaping by taking 4 services as a unit; and similarly, the eight services, with different priorities, of user 3 are mapped into the corresponding VOQs respectively, and the priorities of the VOQs are mapped to scheduler 0 to scheduler 7 of scheduling unit 21 of scheduling level 2 through schedulers 0 to schedulers 7 of corresponding scheduling units 331, 332, 333 and 334 at scheduling level 3, and are mapped to scheduler 0 to scheduler 7 of scheduling unit 11 of scheduling level 1 through scheduler 0 to scheduler 7 of corresponding scheduling unit 21 at scheduling level 2, wherein the eight services of user 3 are mapped to schedulers 0 to schedulers 7 of scheduling units 331, 332, 333 and 334 of scheduling level 3 respectively, so that user 3 performs service aggregation shaping by taking 2 services as a unit.

As shown in FIG. 5, user 2 has two scheduling units at scheduling level 3, and each of the two scheduling units consists of 4 schedulers, wherein the priority of the scheduling unit mounted to scheduler 0 to scheduler 3 of scheduling level 2 is higher, and the priority of the scheduling unit mounted to scheduler 4 to scheduler 7 is lower. When authorizations are distributed to scheduling level 3 from scheduler 0 of scheduling level 2, scheduling level 3 has multiple scheduling units belonging to scheduler 0 of scheduling level 2, then the authorizations are distributed according to weight of each scheduling unit, and a value of the weight is configured by the user. For example, in both scheduling unit 0 and scheduling unit 1, there are schedulers mounted to the same scheduler of the upper level, the weight of scheduling unit 0 is configured to be 2, the weight of scheduling unit 1 is configured to be 3, and then a ratio of authorizations uniformly distributed to scheduling unit 0 and scheduling unit 1 in an authorization process is 2:3. That is, priorities are divided in the scheduling units according to indexes, the priorities are divided between the scheduling units according to a mounting relationship, the priority of the scheduling unit mounted to the schedulers with high priorities at the upper level is high, the priority of the scheduling unit mounted to the schedulers with the same priorities has the same priority, and the authorizations are distributed according to the configured weights. Therefore, the transmitted authorization priority of the same scheduler is the same.

The authorization priorities of the scheduling units of each scheduling level are determined by the corresponding mounting relationship, so that the schedulers in the scheduling units mounted to the same schedulers have the same priorities. The authorization priorities of the VOQs may be traced back to the schedulers of scheduling level 1 level by level according to a mounting configuration relationship, the authorization priorities of the schedulers in the scheduling units to which the schedulers belong are authorization priorities corresponding to the VOQs, the number of the schedulers with different priorities in the scheduling unit of scheduling level 1 is usually determined by the number of service grades, that is, the authorizations are distributed according to the service grades from scheduling level 1.

In the embodiment, the priority transmission of each scheduling level is identified to be a set state, and correspondingly, a VOQ authorization management process includes the following steps:

Step 501: authorization is transmitted to a physical port according to a traffic requirement of the physical port.

Step 502: the authorization is transmitted to the schedulers in the scheduling unit of scheduling level 1.

The current authorization is transmitted to scheduler 0 of scheduling unit 11 of scheduling level 1.

Step 503: an index of the scheduling unit of scheduling level 2 is determined according to scheduling algorithms and shaping state information of the schedulers of scheduling level 1 and the weight and priority of the scheduling units of scheduling level 2.

In the embodiment, the number of the scheduling units of scheduling level 1 and the number of scheduling units of scheduling level 2 are not limited to FIG. 5, and there may be multiple scheduling units at each scheduling level; and in the embodiment, all the schedulers of the scheduling units of each level adopt an SP algorithm, or of course, may also adopt a WFQ algorithm.

It is set that scheduling level 2 includes scheduling unit 21 and the index of the scheduling unit at scheduling level 2 is a binary number 0000~0111, wherein the highest bit 0 identifies the index of scheduling unit 21 in scheduling level 2, three lower bits 000~111 (corresponding to scheduler 0 to scheduler 7 of scheduling unit 21) are the indexes of the 7 schedulers of scheduling unit 21 in scheduling unit 21, and the three lower bits also identify the authorization priorities of the 7 schedulers, wherein scheduler 0 has the highest authorization priority, and scheduler 7 has the lowest authorization priority.

Step 504: scheduling linked list information and the shaping state information of each scheduler of the scheduling unit of scheduling level 2 are acquired according to the index of the scheduling unit of scheduling level 2, and an index of a scheduler to be authorized corresponding to the same service grade with the current authorization in the scheduling unit of scheduling level 2 is determined according to the acquired scheduling linked list information and shaping state information.

Since the current authorization is transmitted by scheduler 0 of scheduling unit 11 of scheduling level 1, that is, the authorization may only be transmitted to the scheduler corresponding to the same service grade with scheduler 0 of scheduling unit 11 of scheduling level 1 in the scheduling unit of scheduling level 2, the current authorization is transmitted to scheduler 0 of scheduling unit 21 of scheduling level 2 when it is determined that a scheduling linked list of scheduler 0 of scheduling unit 21 of scheduling level 2 is not empty according to the acquired scheduling linked list information of scheduler 0 of scheduling unit 21 of scheduling level 2 and the shaping state information is 1, wherein the shaping state information is determined according to a preconfigured traffic requirement of the scheduler and the number of distributed authorizations, and the shaping state information which is 1 identifies that the corresponding scheduler may obtain the authorization; and the scheduling linked list information includes information about a state (empty or full) of the linked list of the scheduler, the authorization may be distributed to the scheduler only when the linked list is not empty, the scheduling linked list information may be preset, and when there is no scheduling unit or VOQ at the next scheduling level of the scheduler, the linked list of the scheduler is empty.

Step 505: the indexes of the scheduling units of scheduling level 3 are determined according to the scheduling algorithm and shaping state information of scheduler 0 of scheduling unit 21 of scheduling level 2 and the weights and priorities of the scheduling units of scheduling level 3.

It is supposed that scheduling level 3 includes scheduling unit 31 and the index of scheduling unit 31 is a binary number 0000~0111, wherein the highest bit 0 identifies the index of scheduling unit 31 of scheduling level 3, and the three lower bits 000~111 identify the authorization priorities of scheduler 0 to scheduler 7 of scheduling unit 31 in scheduling unit 31, wherein scheduler 0 has the highest authorization priority.

Step 506: the scheduling linked list information and shaping state information of each scheduler of the scheduling units of scheduling level 3 are acquired according to the indexes of the scheduling units of scheduling level 3, and the index of the scheduler to be authorized corresponding to the same service grade with the current authorization in the scheduling units of scheduling level 3 is determined according to the acquired scheduling linked list information and shaping state information.

Since the current authorization is transmitted by scheduler 0 of scheduling unit 21 of scheduling level 2, that is, the authorization may only be transmitted to the scheduler corresponding to the same service grade with scheduler 0 of scheduling unit 21 of scheduling level 2 in the scheduling units of scheduling level 3, the current authorization is transmitted to the scheduling units of scheduling level 3 according to the weights of scheduling units 31, 321 and 331 when it is determined that scheduling linked lists of schedulers 0 of scheduling units 31, 321 and 331 of scheduling level 3 are not empty according to the acquired scheduling linked list information of schedulers 0 of scheduling units 31, 321 and 331 of scheduling level 3 and the shaping state information is 1; when it is determined that the scheduling linked list of scheduler 0 of scheduling unit 31 of scheduling level 3 is not empty or the shaping state information is 0, that is, scheduling unit 31 does not require the authorization, the current authorization is transmitted to the scheduling units of scheduling level 3 according to the weights of scheduling units 321 and 331; and by parity of reasoning, authorizations are allocated to the scheduling units mounted to the same authorization priority according to the configured weights.

Processing of subsequent steps is based on authorization distribution to scheduler 0 of scheduling unit 31 of scheduling level 3.

Step 507: scheduler 0 of scheduling unit 31 of scheduling level 3 acquires the corresponding index of the VOQ to be authorized, and transmits the authorization to the VOQ corresponding to the index of the VOQ to be authorized.

From the above, when the priority transmission of each level is identified to be set, priority transmission between the scheduling levels is implemented, the scheduling unit of scheduling level 1 divides service priorities, and the priorities correspond to service grades; then the authorizations are sequentially transmitted to the schedulers in the specific scheduling units of scheduling level 2 and scheduling level 3 according to structures of the scheduling units of each level and algorithms of the schedulers; and the VOQs obtain the authorizations, and the VOQs correspond to services of the user in a certain service grade. User-level scheduling of user 1, user 2 and user 3 is implemented by different scheduling units: user 1 implements aggregation shaping of eight services, user 3 implements aggregation shaping of every four services, and user 3 implements aggregation shaping of every two services; and priority transmission of each service of the users and aggregation shaping of multiple services are implemented, and end-to-end QoS fine management is implemented.

Those skilled in the art should know that the embodiment of the present disclosure may be provided as a method, a system or a computer program product. Therefore, the present disclosure may adopt a pure hardware embodiment, s pure software embodiment and a combined software and hardware embodiment. Moreover, the present disclosure may adopt a computer program product implemented on one or more computer-available storage media (including, but not limited to, a disk memory, a Compact Disc Read-Only Memory (CD-ROM) and an optical memory) including computer-available program codes.

The present disclosure is described with reference to flowcharts and/or block diagrams of the method, equipment (system) and computer program product according to the embodiment of the present disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

The above is only the preferred implementation mode of the present disclosure, it should be pointed out that those skilled in the art may make various improvements and embellishments without departing from the principle of the present disclosure, and these improvements and embellishments shall fall within the scope of protection of the present disclosure.

What is claimed is:

1. A Virtual Output Queue (VOQ) authorization management method, comprising:
   according to a scheduling algorithm of a scheduler of a scheduling unit directly connected with a physical port and according to weight and priority of a scheduling unit at next scheduling level of the scheduling unit, determining an index of the scheduling unit at the next scheduling level;
   acquiring scheduling linked list information of each scheduler of the scheduling unit at the next scheduling level according to the index of the scheduling unit at the next scheduling level, and determining an index of a scheduler to be authorized corresponding to a same service grade with current authorization in the scheduling unit at the next scheduling level according to the scheduling linked list information until an index of a VOQ to be authorized corresponding to the same service grade with the current authorization is determined; and
   transmitting the current authorization from the physical port to the VOQ corresponding to the index of the VOQ to be authorized level by level according to the index of the scheduler to be authorized and the index of the VOQ to be authorized.

2. The method according to claim 1, further comprising:
   before new authorization is transmitted at each scheduling level, updating an index of a scheduling unit at the next scheduling level of current scheduling level according to a scheduling algorithm of a scheduler comprised in a scheduling unit at the current scheduling level and according to weight and priority of the scheduling unit at the next scheduling level of the current scheduling level.

3. The method according to claim 1, further comprising:
   determining the index of the scheduling unit at the next scheduling level of current scheduling level according to shaping state information of the scheduler comprised in the scheduling unit directly connected with the physical port; and
   acquiring corresponding shaping state information according to the index of the scheduling unit at the next scheduling level of the current scheduling level, and determining an index of a scheduler to be authorized corresponding to the same service grade with the current authorization at the next scheduling level of the current scheduling level according to the acquired shaping state information until the index of the VOQ to be authorized corresponding to the same service grade with the current authorization is determined.

4. The method according to claim 3, wherein the indexes of the scheduling units are indexes numbered consecutively, authorization priorities of the scheduling units at corresponding scheduling levels are determined according to a preconfigured mounting relationship, and the indexes of the schedulers comprise authorization priority information of the schedulers in the scheduling units; and
   the scheduling linked list information and the shaping state information of the schedulers take the indexes of the schedulers in the scheduling units to which the schedulers belong as storage indexes.

5. The method according to claim 1, before determining the index of the scheduler to be authorized corresponding to the same service grade, the method further comprising:
   determining priority transmission of current scheduling level to be identified as a set state;
   correspondingly, when the priority transmission of the current scheduling level is determined to be identified as unset, the method further comprising:
   acquiring scheduling linked list information of the scheduler of the scheduling unit at the next scheduling level according to the index of the scheduling unit at the next scheduling level, and determining the index of the scheduler to be authorized in the scheduling unit at the next scheduling level according to the acquired scheduling linked list information until the index of the VOQ to be authorized is determined; and
   transmitting the current authorization from the physical port to the VOQ corresponding to the index of the VOQ level by level according to the index of the scheduler to be authorized and the index of the VOQ to be authorized.

6. The method according to claim 1, before determining the index of the scheduling unit at the next scheduling level, the method further comprising:
   storing storage description information of a packet into a corresponding VOQ according to a Quality of Service (QoS) grade and a destination port of a service corresponding to the packet; and
   after transmitting the authorization to the corresponding VOQ, extracting first storage information from the VOQ obtaining the authorization, acquiring a corresponding packet according to the extracted storage information, and outputting the acquired packet to a destination port corresponding to the VOQ obtaining the authorization.

7. The method according to claim 2, before determining the index of the scheduling unit at the next scheduling level, the method further comprising:
storing storage description information of a packet into a corresponding VOQ according to a Quality of Service (QoS) grade and a destination port of a service corresponding to the packet; and
after transmitting the authorization to the corresponding VOQ, extracting first storage information from the VOQ obtaining the authorization, acquiring a corresponding packet according to the extracted storage information, and outputting the acquired packet to a destination port corresponding to the VOQ obtaining the authorization.

8. The method according to claim 3, before determining the index of the scheduling unit at the next scheduling level, the method further comprising:
storing storage description information of a packet into a corresponding VOQ according to a Quality of Service (QoS) grade and a destination port of a service corresponding to the packet; and
after transmitting the authorization to the corresponding VOQ, extracting first storage information from the VOQ obtaining the authorization, acquiring a corresponding packet according to the extracted storage information, and outputting the acquired packet to a destination port corresponding to the VOQ obtaining the authorization.

9. The method according to claim 4, before determining the index of the scheduling unit at the next scheduling level, the method further comprising:
storing storage description information of a packet into a corresponding VOQ according to a Quality of Service (QoS) grade and a destination port of a service corresponding to the packet; and
after transmitting the authorization to the corresponding VOQ, extracting first storage information from the VOQ obtaining the authorization, acquiring a corresponding packet according to the extracted storage information, and outputting the acquired packet to a destination port corresponding to the VOQ obtaining the authorization.

10. The method according to claim 5, before determining the index of the scheduling unit at the next scheduling level, the method further comprising:
storing storage description information of a packet into a corresponding VOQ according to a Quality of Service (QoS) grade and a destination port of a service corresponding to the packet; and
after transmitting the authorization to the corresponding VOQ, extracting first storage information from the VOQ obtaining the authorization, acquiring a corresponding packet according to the extracted storage information, and outputting the acquired packet to a destination port corresponding to the VOQ obtaining the authorization.

11. A Virtual Output Queue (VOQ) authorization management device, comprising a first determination unit, a second determination unit, an authorization transmission unit and scheduling units, wherein
the first determination unit is configured to determine, according to a scheduling algorithm of a scheduler of a scheduling unit directly connected with a physical port and according to weight and priority of a scheduling unit at next scheduling level of the scheduling unit, an index of the scheduling unit at the next scheduling level;
the second determination unit is configured to acquire scheduling linked list information of each scheduler of the scheduling unit at the next scheduling level according to the index of the scheduling unit at the next scheduling level, and determine an index of a scheduler to be authorized corresponding to a same service grade with current authorization in the scheduling unit at the next scheduling level according to the scheduling linked list information until an index of a VOQ to be authorized corresponding to the same service grade with the current authorization is determined; and
the authorization transmission unit is configured to transmit the current authorization from the physical port to the VOQ corresponding to the index of the VOQ to be authorized level by level according to the index of the scheduler to be authorized and the index of the VOQ to be authorized.

12. The device according to claim 11, further comprising:
an updating unit, configured to, before new authorization is transmitted at each scheduling level, update an index of a scheduling unit at the next scheduling level of current scheduling level according to a scheduling algorithm of a scheduler comprised in a scheduling unit at the current scheduling level and according to weight and priority of the scheduling unit at the next scheduling level of the current scheduling level.

13. The device according to claim 11, wherein the first determination unit is further configured to determine the index of the scheduling unit at the next scheduling level of current scheduling level according to shaping state information of the scheduler comprised in the scheduling unit directly connected with the physical port; and
the second determination unit is further configured to acquire corresponding shaping state information according to the index of the scheduling unit at the next scheduling level of the current scheduling level, and determine an index of a scheduler to be authorized corresponding to the same service grade with the current authorization at the next scheduling level of the current scheduling level according to the acquired shaping state information until the index of the VOQ to be authorized corresponding to the same service grade with the current authorization is determined.

14. The device according to claim 13, wherein the indexes of the scheduling units are indexes numbered consecutively, authorization priorities of the scheduling units in the corresponding scheduling levels are determined according to a preconfigured mounting relationship, and the indexes of the schedulers comprise authorization priority information of the schedulers in the scheduling units; and
the scheduling linked list information and the shaping state information of the schedulers take the indexes of the schedulers in the scheduling units to which the schedulers belong as storage indexes.

15. The device according to claim 11, further comprising a third determination unit, a fourth determination unit and a fifth determination unit, wherein
the third determination unit is configured to, when priority transmission of current scheduling level is determined to be identified as a set state, trigger the first determination unit, and when the priority transmission of the current scheduling level is determined to be identified as an unset state, trigger the fourth determination unit;
the fourth determination unit is configured to acquire scheduling linked list information of the scheduler of the scheduling unit at the next scheduling level according to the index of the scheduling unit at the next scheduling level, and determine the index of the scheduler to be authorized in the scheduling unit at the next scheduling level according to the acquired scheduling linked list information until the index of the VOQ to be authorized is determined; and the fifth determination unit is configured to transmit the current authorization from the physical port to the VOQ corresponding to the index of the VOQ level by level according to the index of the scheduler to be authorized and the index of the VOQ to be authorized.

16. The device according to any one of claim 11, further comprising:
    a VOQ management unit, configured to store storage description information of a packet into a corresponding VOQ according to a Quality of Service (QoS) grade and a destination port of a service corresponding to the packet, and after the authorization is transmitted to the corresponding VOQ, extract first storage information from the VOQ obtaining the authorization, acquire a corresponding packet according to the extracted storage information, and output the acquired packet to a destination port corresponding to the VOQ obtaining the authorization.

17. The device according to claim 12, further comprising:
    a VOQ management unit, configured to store storage description information of a packet into a corresponding VOQ according to a Quality of Service (QoS) grade and a destination port of a service corresponding to the packet, and after the authorization is transmitted to the corresponding VOQ, extract first storage information from the VOQ obtaining the authorization, acquire a corresponding packet according to the extracted storage information, and output the acquired packet to a destination port corresponding to the VOQ obtaining the authorization.

18. The device according to claim 13, further comprising:
    a VOQ management unit, configured to store storage description information of a packet into a corresponding VOQ according to a Quality of Service (QoS) grade and a destination port of a service corresponding to the packet, and after the authorization is transmitted to the corresponding VOQ, extract first storage information from the VOQ obtaining the authorization, acquire a corresponding packet according to the extracted storage information, and output the acquired packet to a destination port corresponding to the VOQ obtaining the authorization.

19. The device according to claim 14, further comprising:
    a VOQ management unit, configured to store storage description information of a packet into a corresponding VOQ according to a Quality of Service (QoS) grade and a destination port of a service corresponding to the packet, and after the authorization is transmitted to the corresponding VOQ, extract first storage information from the VOQ obtaining the authorization, acquire a corresponding packet according to the extracted storage information, and output the acquired packet to a destination port corresponding to the VOQ obtaining the authorization.

20. A computer storage medium, storing computer-executable instructions configured to execute a Virtual Output Queue (VOQ) authorization management method, wherein the method comprises:
    according to a scheduling algorithm of a scheduler of a scheduling unit directly connected with a physical port and according to weight and priority of a scheduling unit at next scheduling level of the scheduling unit, determining an index of the scheduling unit at the next scheduling level;
    acquiring scheduling linked list information of each scheduler of the scheduling unit at the next scheduling level according to the index of the scheduling unit at the next scheduling level, and determining an index of a scheduler to be authorized corresponding to a same service grade with current authorization in the scheduling unit at the next scheduling level according to the scheduling linked list information until an index of a VOQ to be authorized corresponding to the same service grade with the current authorization is determined; and
    transmitting the current authorization from the physical port to the VOQ corresponding to the index of the VOQ to be authorized level by level according to the index of the scheduler to be authorized and the index of the VOQ to be authorized.

\* \* \* \* \*